US006673887B2

(12) United States Patent
Yamaguchi et al.

(10) Patent No.: US 6,673,887 B2
(45) Date of Patent: Jan. 6, 2004

(54) CURED FLUORINE-CONTAINING MATERIAL

(75) Inventors: Koichi Yamaguchi, Matsuida-machi (JP); Hirofumi Kishita, Matsuida-machi (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 53 days.

(21) Appl. No.: 09/885,068

(22) Filed: Jun. 21, 2001

(65) Prior Publication Data

US 2002/0028903 A1 Mar. 7, 2002

(30) Foreign Application Priority Data

Jun. 22, 2000 (JP) ........................................ 2000-187932

(51) Int. Cl.[7] ................................................ C08G 77/06
(52) U.S. Cl. ............................ 528/15; 528/31; 528/42; 528/401
(58) Field of Search ............................. 528/31, 36, 42, 528/401, 15

(56) References Cited

U.S. PATENT DOCUMENTS

| 4,565,714 | A | * | 1/1986 | Koshar | ........................ 427/515 |
| 5,837,774 | A | * | 11/1998 | Tarumi et al. | ............... 525/100 |
| 6,297,339 | B1 | * | 10/2001 | Osawa et al. | .................. 528/15 |
| 6,414,062 | B1 | * | 7/2002 | Fukuda et al. | ............... 524/267 |

FOREIGN PATENT DOCUMENTS

| EP | 923084 A1 | * | 6/1999 |
| EP | 1075034 A1 | * | 2/2001 |

* cited by examiner

Primary Examiner—Robert Dawson
Assistant Examiner—Marc S Zimmer
(74) Attorney, Agent, or Firm—Millen, White, Zelano & Branigan, P.C.

(57) ABSTRACT

A cured fluorine-containing material comprising a perfluoropolyether of the formula: —(Rf—O)$_q$— wherein Rf is a perfluoroalkylene group of 1–6 carbon atoms and q is 1–500 as the backbone is suitable as an antireflection film since it has a low refractive index of up to 1.335 at 25° C.

14 Claims, No Drawings

CURED FLUORINE-CONTAINING MATERIAL

This invention relates to cured fluorine-containing materials having a refractive index of up to 1.335 at 25° C. and best suited as optical materials such as antireflection films as well as rubber materials, tent film materials, sealants, coating materials, and parting agents where solvent resistance is required.

BACKGROUND OF THE INVENTION

Heretofore, curable fluorine-containing compositions primarily comprising a polymer of fluorine-containing organic compound and a crosslinking agent have been used in a variety of applications.

With the rapid development of the information society, large size displays of the liquid crystal, CRT, plasma and other systems are on widespread use. Those displays, especially of the portable type, used outdoor or in an illuminated space are required to improve their recognition capability. One common means for improving the recognition capability is to provide the substrate of a display device with an antireflection film of low refractive index materials, typically fluorine compounds. Such antireflection films are formed by vacuum evaporating inorganic materials or by depositing alternating films of high and low refractive index materials, which techniques lack productivity.

Known low refractive index materials which can be coated have a refractive index of 1.34 at the lowest. There is a need for a material having a lower refractive index.

SUMMARY OF THE INVENTION

An object of the invention is to provide a cured fluorine-containing material having a sufficiently low refractive index to be used as an antireflection film or the like.

It has been found that a curable composition comprising (A) a linear fluoropolyether compound having at least two alkenyl groups per molecule and a perfluoroalkyl ether structure in the backbone, (B) a fluorine-containing organohydrogensiloxane, and (C) a platinum group catalyst can be coated in solution form and converted, by holding at room temperature or heating, into a cured thin film comprising a perfluoropolyether backbone and having a refractive index of up to 1.335 at 25° C., especially when the fluorine content in the cured film is at least 61.0% by weight.

Briefly stated, the invention provides a cured fluorine-containing material having a refractive index of up to 1.335 at 25° C. comprising as the backbone a perfluoropolyether of the following general formula (1):

$$—(Rf—O)_q— \quad (1)$$

wherein Rf is a perfluoroalkylene group of 1 to 6 carbon atoms and q is a number of 1 to 500.

DESCRIPTION OF THE PREFERRED EMBODIMENT

The cured fluorine-containing material of the invention is obtained by curing a curable composition comprising (A) a linear fluoropolyether compound having at least two alkenyl groups per molecule and a perfluoroalkyl ether structure of the formula (1) in the backbone, (B) a fluorine-containing organohydrogensiloxane, and (C) a platinum group catalyst.

The linear fluoropolyether compound (A) should have at least two alkenyl groups per molecule and a perfluoroalkyl ether structure in the backbone. It is used as a base polymer in the composition.

The alkenyl groups in the linear fluoropolyether compound are, for example, groups having a $CH_2=CH—$ structure at the terminus such as vinyl, allyl, propenyl, isopropenyl, butenyl and hexenyl, and preferably vinyl and allyl. The alkenyl groups may be attached to the backbone of linear fluoropolyether compound at opposite ends directly or through divalent linking groups such as $—CH_2—$, $—CH_2O—$ or $—Y—NR—CO—$. Herein Y is $—CH_2—$ or:

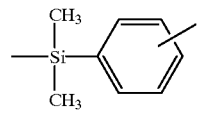

(wherein the free valence bond may be at an o-, m- or p-position), and R is hydrogen, methyl, phenyl or allyl.

The perfluoroalkyl ether structure in the linear fluoropolyether compound is of the general formula (1) as mentioned above.

$$—(Rf—O)_q— \quad (1)$$

Rf is a straight or branched perfluoroalkylene group of 1 to 6 carbon atoms, preferably 1 to 3 carbon atoms, and q is an integer of 1 to 500, preferably 2 to 400, and more preferably 10 to 200.

Examples of the recurring units represented by $—(Rf—O)—$ include $—CF_2—$, $—CF_2CF_2O—$, $—CF_2CF_2CF_2O—$, $—CF(CF_3)CF_2O—$, $—CF_2CF_2CF_2CF_2O—$, $—CF_2CF_2CF_2CF_2CF_2CF_2O—$, and $—C(CF_3)_2O—$. Preferred among these are $—CF_2—$, $—CF_2CF_2O—$, $—CF_2CF_2CF_2O—$, and $—CF(CF_3)CF_2O—$. Especially preferred are perfluoropolyethers comprising recurring units of hexafluoropropenoxide. The perfluoroalkyl ether structure may consist of one or more types of recurring units represented by $—(Rf—O)—$.

Examples of the linear fluoropolyether compound (A) are linear fluoropolyether compounds of the following general formula (2):

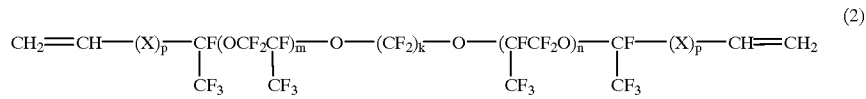

wherein X is independently $—CH_2—$, $—CH_2O—$, or $—Y—NR—CO—$, Y is $—CH_2—$ or:

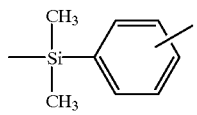

(wherein the free valence bond may be at an o-, m- or p-position), R is hydrogen, methyl, phenyl or allyl, p is independently 0 or 1, k is an integer of 2 to 6, m and n each are an integer of 0 to 200, preferably 5 to 150, and having a weight average molecular weight of about 400 to 100,000, preferably about 2,000 to 50,000.

Illustrative, non-limiting examples of the linear fluoropolyether compound (A) are shown below:

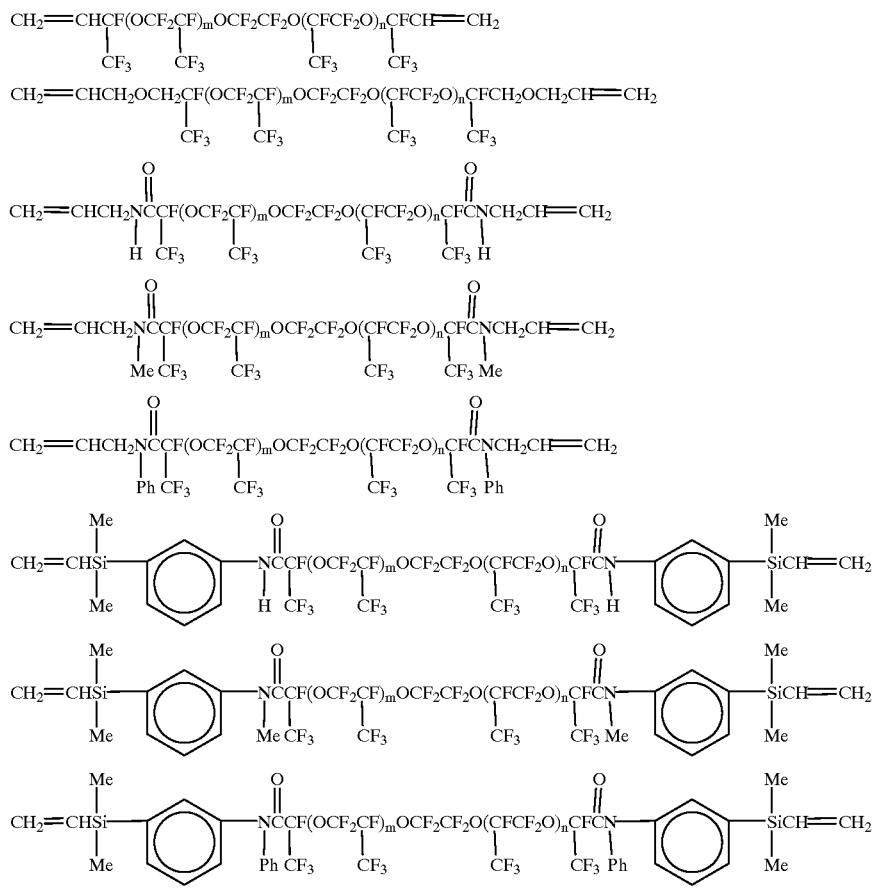

In the above formulas, m and n are as defined in formula (1), Me is methyl and Ph is phenyl.

These linear fluoropolyether compounds may be used alone or in admixture of two or more.

The linear fluoropolyether compound (A) used herein may range from a low viscosity polymer having a viscosity of several ten centistokes at 25° C. to a solid gum-like polymer. From the ease of handling standpoint, polymers having a viscosity of about 1,000 to 100,000 centistokes at 25° C. are advantageously used for coating purposes. Polymers having a too low viscosity may result in cured films having reduced film strength and/or adhesion, failing to provide a good profile of physical properties.

The fluorine-containing organohydrogensiloxane (B) serves as a crosslinking agent or chain extender for the linear fluoropolyether compound (A). The fluorine-containing organohydrogensiloxane is not critical as long as it has at least one monovalent perfluoroalkyl group, monovalent perfluorooxyalkyl group, divalent perfluoroalkylene or divalent perfluorooxyalkylene group and at least two, preferably at least three hydrosilyl groups, i.e., Si—H groups in a molecule. The perfluoroalkyl, perfluorooxyalkyl, perfluoroalkylene and perfluorooxyalkylene groups are exemplified by the groups of the following general formulae.

monovalent perfluoroalkyl groups:

Letter p is an integer of 1 to 20, preferably 2 to 10.
divalent perfluoroalkylene groups:

Letter p is an integer of 1 to 20, preferably 2 to 10.
monovalent perfluorooxyalkyl groups:

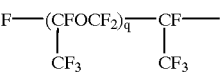

Letter q is an integer of 1 to 5.

divalent perfluorooxyalkylene groups:

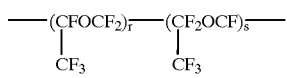

The sum of r+s is an integer of 2 to 100 on average.

The divalent linking group which links the perfluoroalkyl, perfluorooxyalkyl, perfluoroalkylene or perfluorooxyalkylene group to the silicon atom is an alkylene group, arylene group or a mixture thereof, which may further have an ether bond oxygen atom, amide bond or carbonyl bond. Such divalent linking groups of 2 to 12 carbon atoms are preferred. Illustrative examples thereof include
—CH$_2$CH$_2$—, —CH$_2$CH$_2$CH$_2$—, —CH$_2$CH$_2$CH$_2$OCH$_2$—,
—CH$_2$CH$_2$CH$_2$—NH—CO—, —CH$_2$CH$_2$CH$_2$—N(Ph)—CO—,
—CH$_2$CH$_2$CH$_2$—N(CH$_3$)—CO—, and —CH$_2$CH$_2$CH$_2$—O—CO—
wherein Ph is phenyl.

In addition to the monovalent organic group containing a monovalent or divalent fluorinated substituent, that is, a perfluoroalkyl, perfluorooxyalkyl, perfluoroalkylene or perfluorooxyalkylene group, the fluorine-containing organohydrogensiloxane (B) may have a monovalent substituent attached to a silicon atom. Exemplary monovalent substituents are substituted or unsubstituted hydrocarbon groups of 1 to 20 carbon atoms including alkyl groups such as methyl, ethyl, propyl, butyl, isobutyl, tert-butyl, pentyl, hexyl, octyl and decyl; cycloalkyl groups such as cyclopentyl, cyclohexyl and cycloheptyl; alkenyl groups such as vinyl, allyl, propenyl, isopropenyl, butenyl and hexenyl; aryl groups such as phenyl, tolyl, xylyl and naphthyl; aralkyl groups such as benzyl, phenylethyl and phenylpropyl; and substituted ones of these groups in which some of the hydrogen atoms are replaced by chlorine atoms, cyano groups or the like, such as chloromethyl, chloropropyl, and cyanoethyl.

The fluorine-containing organohydrogensiloxane may be cyclic, chainlike or three-dimensional network. The number of silicon atoms in the molecule of the fluorine-containing organohydrogensiloxane is desirably about 2 to about 200, and especially about 3 to about 150, though not limited thereto.

Illustrative examples of the fluorine-containing organohydrogensiloxane are given below. They may be used alone or in admixture of two or more. In the formulae, Me is methyl and Ph is phenyl.

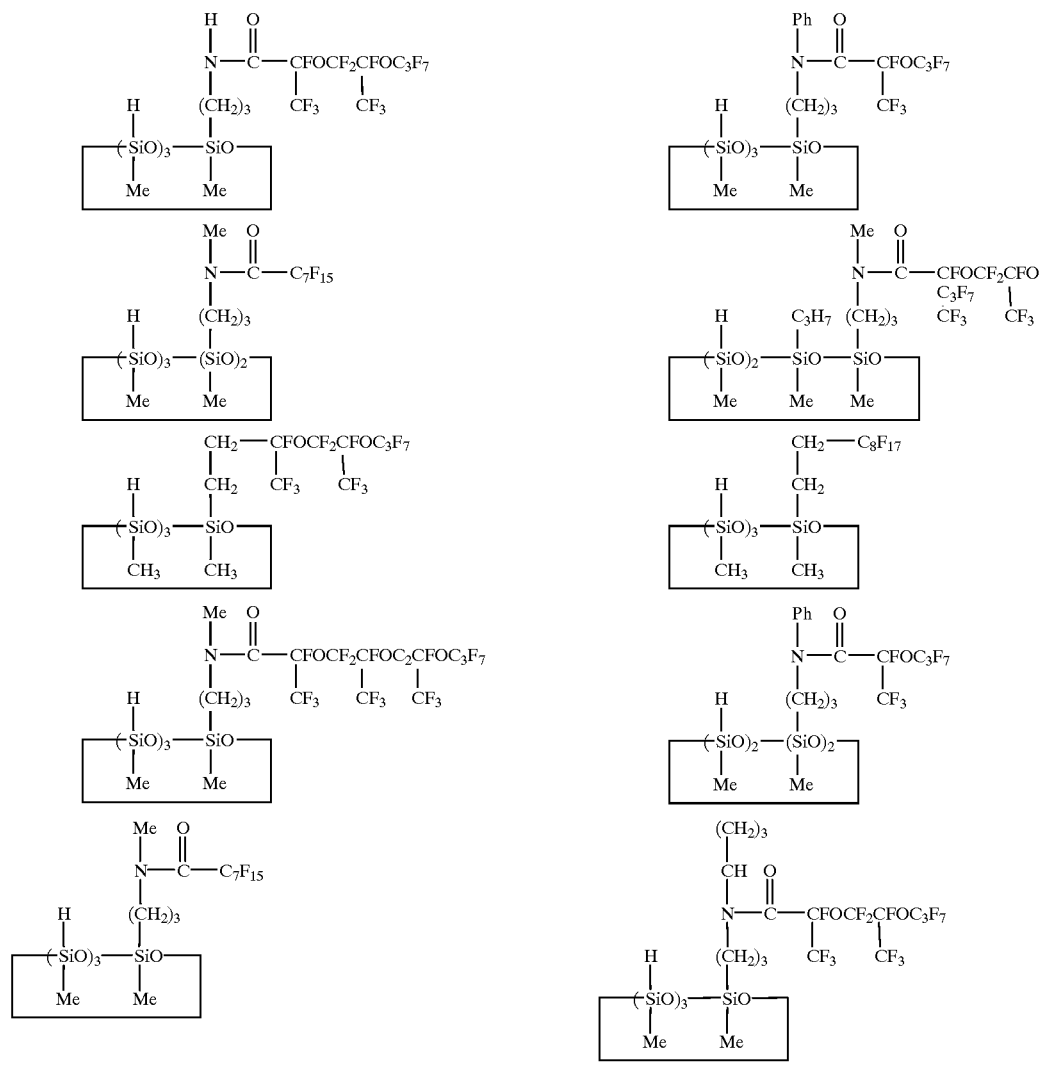

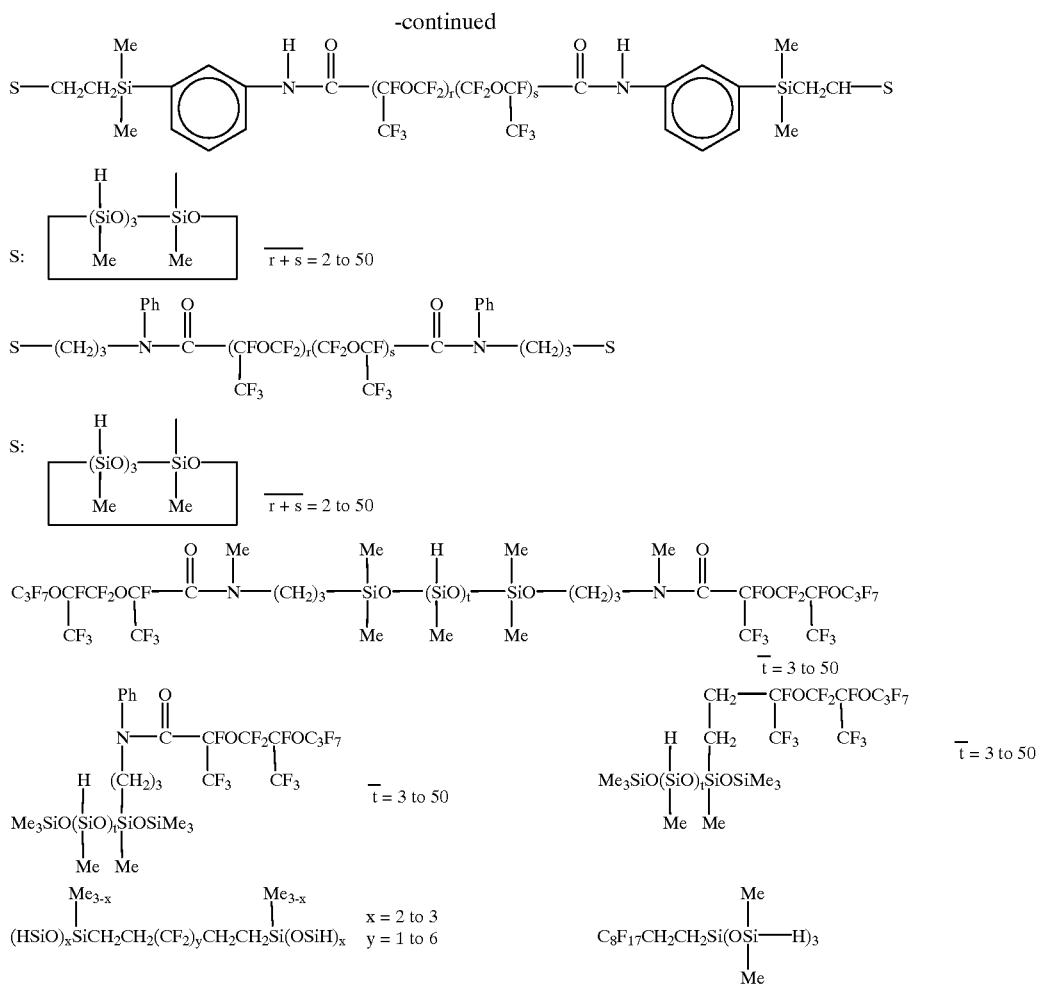

Usually, component (B) having hydrosilyl groups is blended in such an amount that 0.5 to 5 mol, and more preferably 1 to 2 mol of the hydrosilyl (or SiH) groups may be available per mol of aliphatic unsaturated groups (e.g., vinyl, allyl or cycloalkenyl) in the entire composition. Less than 0.5 mol of hydrosilyl groups may achieve an insufficient degree of crosslinking. More than 5 mol of hydrosilyl groups may allow chain lengthening to become preferential, inviting short curing, foaming, and losses of heat resistance and the like. An appropriate amount of component (B) blended is usually 0.1 to 50 parts, preferably 0.1 to 20 parts by weight per 100 parts by weight of component (A).

The platinum group catalyst (C) is a catalyst for promoting the addition reaction or hydrosilylation of the fluoropolyether compound with the fluorine-containing organohydrogensiloxane. Exemplary catalysts are chloroplatinic acid, alcohol solutions of chloroplatinic acid, aldehyde solutions of chloroplatinic acid, and complex salts of chloroplatinic acid with olefin compounds.

The platinum group catalyst is added in an amount necessary to promote the addition reaction, usually in such an amount as to provide 10 to 500 ppm of platinum group metal based on component (A).

Various well-known additives may be added to the inventive composition for improving its practical usage insofar as they do not interfere with curing. For example, there may be added addition reaction regulators for controlling the activity of the platinum group catalyst (C), such as organic nitrogen compounds, organic phosphorus compounds and acetylene compounds. It should be avoided to add those additives which cause the cured part to have a refractive index in excess of 1.335.

It is not critical how to prepare the cured fluorine-containing material according to the invention. Typically it is prepared by compounding the above-described components and heat curing the compound.

On practical usage, the cured fluorine-containing material of the invention is obtained by applying a composition comprising components (A) to (C) onto a substrate, and curing the composition to the substrate surface. If desired, the composition is dissolved in a fluorochemical solvent such as meta-xylene hexafluoride or florinate before it is applied. The substrate may be of glass or various plastics. Any well-known technique may be employed to apply the composition to the substrate. The curing conditions for the composition may be selected as appropriate. Room temperature curing is possible depending on the type of components (A), (B) and (C) although heat curing at 50 to 150° C. for several ten seconds to several ten minutes is preferred.

The cured fluorine-containing material of the invention should have a refractive index at 25° C. of up to 1.335, preferably 1.300 to 1.335, and more preferably 1.310 to 1.330. Since this belongs to the lowest refractive index class of organic materials, the inventive material can be advantageously used as an optical material such as antireflection film material. The cured material of the invention has improved solvent resistance and chemical resistance due to its high fluorine content, and improved parting properties and water repellency due to its low surface energy. Since the starting composition can be diluted with a solvent, the cured fluorine-containing material is obtainable at low cost. For these reasons, the cured fluorine-containing material of the invention is also advantageously used in the application where solvent resistance is required, typically as rubber materials, tent film materials, sealants, coating materials, and parting agents.

It is preferred for achieving a lower refractive index that the cured fluorine-containing material of the invention have a fluorine content of at least 61.0%, more preferably 61 to 75%, and most preferably 62 to 70% by weight.

There has been described a cured fluorine-containing material having a lower refractive index and useful as antireflection film or the like.

EXAMPLE

Examples of the invention are given below by way of illustration and not by way of limitation. All parts are by weight. The viscosity and refractive index are measurements at 25° C. Me is methyl.

Example 1

A coating solution was prepared by diluting 100.0 parts of linear fluoropolyether compound I of the following formula (3) (viscosity 8,248 cs, average molecular weight 22,472, vinyl content 0.0089 mol/100 g) as component (A) and 2.49 parts of fluorine-containing hydrogensiloxane i of the following formula (4) as component (B) (giving H/Vi=1.2) with 50 parts of a fluorochemical solvent (trade name: FR Thinner, Shin-Etsu Chemical Co., Ltd.) and adding thereto 1.5 parts of a toluene solution of divinyltetramethyldisiloxane complex of chloroplatinic acid (Pt concentration 0.5 wt %). The coating solution was applied onto a Teflon® sheet so that the dry film might have a thickness of 100 μm, held for 5 minutes in an atmosphere of 25° C. and RH 50%, and heat cured at 130° C. for 1 minute. The cured film thus obtained was stripped from the Teflon sheet and measured for refractive index using an Abbe refractometer (by Atago K. K.), finding a refractive index of 1.313.

linear fluoropolyether compound I (3)

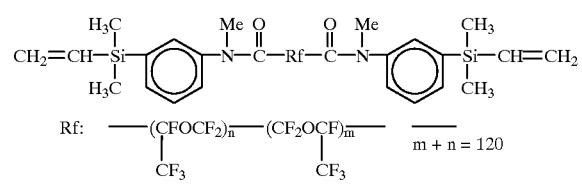

Rf: ——(CFOCF$_2$)$_{\overline{n}}$——(CF$_2$OCF)$_{\overline{m}}$—— $\quad \overline{m+n=120}$
        |                          |
        CF$_3$                     CF$_3$ fluorine-containing hydrogensiloxane i (4)

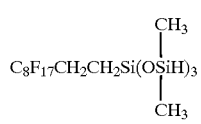

Example 2

A coating solution was prepared as in Example 1 except that linear fluoropolyether compound II of the following formula (5) was used instead of linear fluoropolyether compound I as component (A) and fluorine-containing hydrogensiloxane ii of the following formula (6) used instead of the fluorine-containing hydrogensiloxane i (giving H/Vi=1.2). A cured film was similarly obtained therefrom and had a refractive index of 1.316.

linear fluoropolyether compound II (5)

[Structure: CH$_2$=CH–Si(CH$_3$)$_2$–C$_6$H$_4$–N(Me)–C(O)–Rf–C(O)–N(Me)–C$_6$H$_4$–Si(CH$_3$)$_2$–CH=CH$_2$]

Rf: ——(CFOCF$_2$)$_{\overline{n}}$——(CF$_2$OCF)$_{\overline{m}}$—— $\quad \overline{m+n=90}$
        |                          |
        CF$_3$                     CF$_3$ fluorine-containing hydrogensiloxane ii (6)

[Structure:
CH$_2$OCH$_2$CFOCF$_2$CFOC$_3$F$_7$ (with CF$_3$, CF$_3$ side groups)
|
CH$_2$
|
Me$_3$SiO(SiO)$_{37.5}$(SiO)$_{10}$(SiO)$_{2.5}$(SiO)$_{48}$SiMe$_3$
      (H/Me) (CH$_2$/Me) (Me/CH$_2$) (Me/Me)
|
CH$_2$
|
Me$_2$Si–C$_6$H$_4$–N(Me)–C(O)–CF(OCF$_2$CF)$_{25}$F
                                  CF$_3$  CF$_3$]

Examples 3–5 and Comparative Examples 1–3

Cured films were obtained as in Example 1 except that coating solutions were prepared using components (A) and (B) shown in Table 1 instead of the components (A) and (B) used in Example 1 and in the amounts shown in Table 2 (giving H/Vi=1.2). The refractive indexes of the cured forms are shown in Table 2.

TABLE 1

|  |  | Average molecular weight | n + m | F content (%) | Refractive index |
|---|---|---|---|---|---|
| Component (A) | I | 20,360 | 120 | 67.2 | 1.311 |
|  | II | 15,380 | 90 | 66.7 | 1.313 |
|  | III | 6,080 | 34 | 63.8 | 1.326 |
|  | IV | 5,480 | 32 | 66.6 | 1.311 |
|  | V | 1,670 | 9 | 61.7 | 1.329 |
|  | VI | 1,170 | 6 | 58.9 | 1.339 |
| Component (B) | i | — | — | 46.1 | 1.348 |
|  | ii | — | — | 45.8 | 1.351 |
|  | iii | — | — | 0 | 1.387 |

Components (A) and (B) are as shown below.

Component (A), I to III

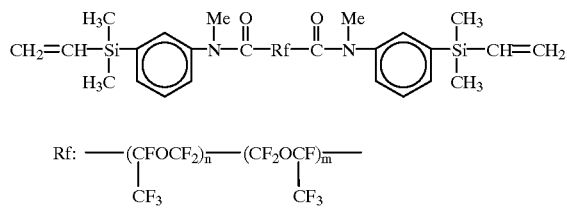

Rf: 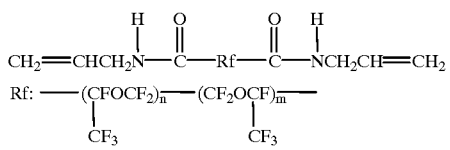

Component (A), IV to VI

CH$_2$=CHCH$_2$N(H)—C(=O)—Rf—C(=O)—N(H)CH$_2$CH=CH$_2$

Rf: —(CFOCF$_2$)$_{\overline{n}}$—(CF$_2$OCF)$_{\overline{m}}$—
         |                    |
         CF$_3$               CF$_3$ Component (B), iii

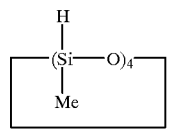

TABLE 2

| | Component (A) | Amount (parts) | Component (B) | Amount (parts) | Cured film F content (%) | Cured film Refractive index |
|---|---|---|---|---|---|---|
| Example | | | | | | |
| 1 | I | 100 | i | 2.49 | 66.7 | 1.313 |
| 2 | II | 100 | ii | 8.26 | 65.1 | 1.316 |
| 3 | III | 100 | i | 8.42 | 62.4 | 1.334 |
| 4 | IV | 100 | i | 9.89 | 64.8 | 1.316 |
| 5 | IV | 80 | i | 12.7 | 62.8 | 1.327 |
|   | VI | 20 | | | | |
| Comparative Example | | | | | | |
| 1 | V | 100 | i | 33.55 | 57.8 | 1.342 |
| 2 | VI | 100 | iii | 48.1 | 54.7 | 1.355 |
| 3 | IV | 60 | i | 25.2 | 60.8 | 1.337 |
|   | VI | 40 | | | | |

Japanese Patent Application No. 2000-187932 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A cured fluorine-containing material comprising as the backbone a perfluoropolyether of the following general formula (1):

—(Rf—O)$_q$—     (1)

wherein Rf is a perfluoroalkylene group of 1 to 6 carbon atoms and q is a number of 1 to 500, wherein the cured fluorine-containing material has a refractive index of up to 1.335 at 25° C., and wherein the cured fluorine-containing material is obtained by curing a curable composition comprising:

(A) a linear fluoropolyether compound having at least two alkenyl groups per molecule and a perfluoroalkyl ether structure of the formula (1) in the backbone, wherein said linear fluoropolyether compound is of the following formula (2):

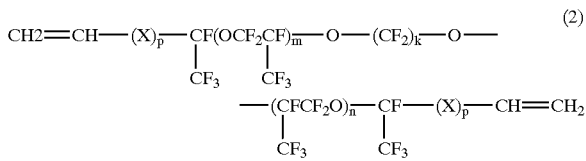

wherein X is independently —CH$_2$—, —CH$_2$O—, or —Y—NR—CO—,
Y is —CH$_2$— or

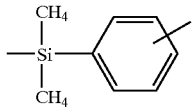

in the o, m or p position,
R is hydrogen, methyl, phenyl or allyl,
p is independently 0 or 1, k is an integer of 2 to 6, and m and n each are an integer of 0 to 200, (B) a fluorine-containing organohydrogensiloxane, and (C) a platinum group catalyst, wherein the fluorine-containing organohydrogensiloxane, (B), having hydrosilyl groups, is provided in an amount such that 0.5 to 5 mol of the hydrosilyl groups are available per mol of alkenyl groups in the linear fluoropolyether compound, (A).

2. The cured fluorine-containing material of claim 1 wherein the perfluoropolyether is comprised of recurring units of hexafluoropropenoxide.

3. The cured fluorine-containing material of claim 1, wherein said fluorine-containing organohydrogensiloxane (B) is a compound having at least one monovalent perfluorooxyalkyl, monovalent perfluoroalkyl, divalent perfluorooxyalkylene or divalent perfluoroalkylene group and at least two hydrosilyl groups in a molecule.

4. The cured fluorine-containing material of claim 1 which has a fluorine content of at least 61.0% by weight.

5. The cured fluorine-containing material of claim 1, wherein the material is in the form of an antireflection film.

6. The cured fluorine-containing material of claim 1, wherein, in formula (1), Rf is a straight or branched perfluoroalkylene group of 1 to 3 carbon atoms, and q is an integer of 10 to 200.

7. The cured fluorine-containing material of claim 1, wherein, in formula (1), —(Rf—O)— is —CF$_2$CF$_2$O—, —CF$_2$CF$_2$CF$_2$O—, —CF(CF$_3$)CF$_2$O—, —CF$_2$CF$_2$CF$_2$CF$_2$O—, —CF$_2$CF$_2$CF$_2$CF$_2$CF$_2$O—, or.

8. The cured fluorine-containing material of claim 1, wherein the fluorine-containing organohydrogensiloxane, (B), is a cyclic organohydrogensiloxane.

9. The cured fluorine-containing material of claim 1, wherein the fluorine-containing organohydrogensiloxane, (B), has 2 to about 200 silicon atoms.

10. The cured fluorine-containing material of claim 1, wherein the fluorine-containing organohydrogensiloxane, (B), having hydrosilyl groups, is provided in an amount such that 1 to 2 mol of the hydrosilyl groups are available per mol of alkenyl groups in the linear fluoropolyether compound, (A).

11. The cured fluorine-containing material of claim 1, wherein the material has a refractive index at 25° C. of 1.300 to 1.335.

12. The cured fluorine-containing material of claim 1, wherein the material has a refractive index at 25° C. of 1.310 to 1.330.

13. The cured fluorine-containing material of claim 1, wherein the material has a fluorine content of 61 to 75%.

14. The cured fluorine-containing material of claim 1, wherein the material has a fluorine content of 62 to 70% by weight.

* * * * *